Nov. 4, 1941.   P. PASCHEN ET AL   2,261,697
BEARING
Filed Aug. 3, 1939
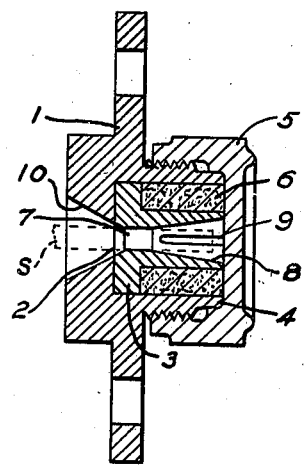
WITNESSES:
INVENTORS
Paul Paschen and
Georg Mohr.
BY
ATTORNEY Patented Nov. 4, 1941

2,261,697

UNITED STATES PATENT OFFICE 2,261,697

BEARING

Paul Paschen and Georg Mohr, Nuremberg, Germany, assignors to Westinghouse Electric & Manufacturing Company, East Pittsburgh, Pa., a corporation of Pennsylvania Application August 3, 1939, Serial No. 288,120
In Germany August 3, 1938

7 Claims. (Cl. 308—133)

This invention relates to bearings, and it has particular relation to bearings for small electrical devices, such as synchronous motors employed for driving clocks and metering apparatus.

In small motors which usually rotate at comparatively high speeds, the rotor bearings, the lubrication for the bearings and the suppression of rotating noises are problems difficult to solve satisfactorily. The small oil supply lodged in the bearing of the small motor often is used up unusually rapidly, because of oil creepage along the motor shaft to the rotor, which, under the influence of centrifugal forces, continues to move the oil forwardly. Furthermore, oil losses are also caused by the bearing variations resulting from fluctuations in temperature. Running noises are particularly objectionable in such small motors, especially small synchronous motors. These noises arise because of the small mass and moment of inertia of the rotor which are not sufficient to equalize or smooth the unavoidable variations in torque.

In accordance with this invention, a bearing for small motors is provided which retains its lubricant and which operates to damp vibration and unnecessary noise. To this end, a bearing is provided with funnels, one funnel extending from each end of the bearing. If the bearing is provided on one side with an oil chamber, it is desirable to provide the funnel opening into the oil chamber with a smaller conical angle than that of the remaining funnel. Furthermore, the funnel opening into the oil chamber may be provided with one or more slots for permitting the passage of lubricant or oil between the chamber and the bearing. Because of the tapered space provided between the shaft and the funnel opening into the oil chamber, a capillary force is exerted on the oil which tends to retain it in the bearing. In addition, the ring-shaped wedge of oil in this space operates to damp the vibrations and noise which ordinarily are present in small motors.

It is, therefore, an object of our invention to provide an improved bearing for rotating shafts.

It is another object of our invention to provide a bearing having hollow conical extensions on each side thereof.

It is another object of our invention to provide a bearing having hollow conical extensions on each side, which extensions have different tapers.

It is another object of our invention to provide a bearing for a lubricant reservoir with a funnel extending towards said reservoir for providing with a shaft in said bearing a small capillary space capable of exerting a capillary force on the lubricant for retaining said lubricant in the bearing.

Other objects of our invention will be apparent from the following description taken in conjunction with the accompanying drawing, in which the single figure shows a vertical cross-section of a bearing embodying our invention.

Referring to the drawing, the figure shows a bearing having a supporting base 1 and a bearing bushing 2 associated therewith. Preferably, the bearing bushing is provided with a flange 3 which fits into a chamber provided by a cylindrical threaded extension 4 on the supporting base 1. The threaded extension 4 preferably is covered by a cap 5 which is provided with threads for engaging the threads on the extension. The chamber defined by the extension 4 and the cap 5 may be employed for a lubricant or oil reservoir. If desired, this reservoir may be packed with felt or other oil absorbent material.

The bearing bushing 2 is provided with a cylindrical bearing portion 7 in which a shaft S, shown in broken lines, may be rotatably mounted. A funnel 8 is provided on the side of the bearing portion 7 which is surrounded by the lubricant, and this funnel is proportioned to provide with the shaft S a ring-shaped tapering space for the lubricant. Because of this space, a capillary force is exerted during normal operation of the bearing which tends to draw the lubricant from the reservoir 6 towards the bearing, and which tends to prevent passage of the lubricant along the shaft S. If desired, one or more slots 9 may be provided in the funnel 8 for facilitating passage of the lubricant between the reservoir 6 and the bearing portion 7.

At the opposite end of the bushing 2 a second funnel or taper 10 is provided for permitting entry of the shaft S into the bearing portion 7. It will be noted that the funnel 10 has a larger conical angle or taper than that of the funnel 8. Because of this difference in taper, the capillary force exerted on the lubricant within the funnel 8 is greater than that exerted on the lubricant within the funnel 10, and for this reason the lubricant does not flow out of the funnel 10 or along the shaft S. Preferably, the length of the funnel portion 8 is equal to or greater than the length of the bearing portion 7. As illustrated, the length of the funnel portion 10 may be equal to or greater than that of the bearing portion 7.

Although the parts may be constructed in various ways, the supporting base 1 may conveniently be formed as a die casting. The bushing 2 then is formed as a separate element and inserted in place within the extension 4.

It is believed that the operation of our invention is apparent from the foregoing description thereof. During normal operation of a motor equipped with the bearing herein described, lubricant is drawn from the reservoir 6 to the interior of the funnel 8 under the influence of capillary forces exerted by the ring-shaped tapered capillary space between the shaft and the funnel. Consequently, lubricant is maintained adjacent the bearing portion 7 at all times. Furthermore, since the capillary force exerted by the ring-shaped tapered body of oil between the shaft and the funnel 8 is greater than that developed by oil in the funnel 10, which has a taper larger than that of the funnel 8, lubricant is prevented from flowing along the shaft S away from the bearing or out of the funnel 10. The capillary force developed by the lubricant within the funnel 8 is also enhanced by operation of the slots 9. Because of the oil films formed in the ring-shaped spaces between the shaft and the funnels, a damping action is provided for the shaft S. This damping action reduces the noise caused by vibration of the shaft.

Although we have described our invention with reference to certain specific embodiments thereof, it is obvious that many modifications thereof are possible. Therefore, we do not wish our invention to be restricted except as required by the accompanying claims when interpreted in view of the prior art.

We claim as our invention:

1. In a bearing structure, a bearing assembly provided with a first portion having a bearing surface for rotatably receiving a shaft, and a second portion positioned to extend along said shaft away from said bearing surface and having a tapered surface communicating with said bearing surface, said tapered surface forming an extension of said bearing surface and having a dimension increasing gradually from one end of said bearing surface to a larger dimension distant from said bearing surface for providing a gradually increasing space about said shaft, said tapered surface being proportioned to form with a shaft enclosed therein a capillary passage for lubricant tending to urge said lubricant in a predetermined direction.

2. In a bearing structure, a bearing assembly provided with a first portion having a bearing surface for rotatably receiving a shaft, a second portion positioned to extend along said shaft away from said bearing surface and having a tapered surface communicating with said bearing surface, said tapered surface having a dimension increasing gradually from one end of said bearing surface to a larger dimension distant from said bearing surface for providing a gradually increasing capillary space for lubricant about a shaft mounted therein, the axial length of said second portion being at least of the order of that of said bearing surface, and a third portion having a dimension increasing gradually from a second end of said bearing surface to a larger dimension distant from said bearing surface.

3. In a bearing structure, a bearing assembly provided with a first portion having a bearing surface for rotatably receiving a shaft, a second portion positioned to extend along said shaft away from said bearing surface and having a tapered surface communicating with said bearing surface, said tapered surface having a dimension increasing gradually from one end of said bearing surface to a larger dimension distant from said bearing surface for providing a gradually increasing capillary space for lubricant about a shaft mounted therein, the axial length of said second portion being at least of the order of that of said bearing surface, and a third portion positioned to extend along said shaft away from said bearing surface and having a dimension increasing gradually from a second end of said bearing surface to a larger dimension distant from said bearing surface, the dimension of said third portion increasing at a faster rate than the dimension of said second portion.

4. In a bearing structure, a bearing assembly provided with a first portion having a bearing surface for rotatably receiving a shaft, a second portion positioned to extend along said shaft away from said bearing surface and having a tapered surface communicating with said bearing surface, said tapered surface having a dimension increasing gradually from one end of said bearing surface to a larger dimension distant from said bearing surface for providing a gradually increasing space about a shaft mounted therein, the axial length of said second portion being at least of the order of that of said bearing surface, a third portion positioned to extend along said shaft away from said bearing surface and having a dimension increasing gradually from a second end of said bearing surface to a larger dimension distant from said bearing surface, the dimension of said third portion increasing at a faster rate than the dimension of said second portion, and a lubricant reservoir adjacent said second portion, said second portion having an opening extending therethrough for permitting lubricant to pass from said reservoir to said shaft.

5. In a bearing structure, a supporting member provided with a recess, a bearing member positioned in said recess, said bearing member having a cylindrical bearing portion and a hollow conical surface portion expanding along the axis of said cylindrical bearing portion from said bearing portion to a larger dimension distant therefrom, the angle of said conical surface being selected to form with a shaft positioned in said bearing member a capillary passage for lubricant, and a closure for said recess, said supporting member having a tapered opening communicating with said cylindrical bearing portion for permitting the introduction of a shaft into said cylindrical bearing portion.

6. In a bearing structure, a bearing member having a bearing portion for rotatably receiving a shaft, and means for confining lubricant for said bearing member to a predetermined region adjacent said bearing portion comprising a funnel for surrounding said shaft on each side of said bearing portion, each of said funnels having its small end adjacent said bearing portion and one of said funnels having a taper proportioned to form with a shaft in said bearing member a capillary passage for lubricant.

7. In a bearing structure, a bearing member having a bearing portion for rotatably receiving a shaft, means for confining lubricant for said bearing member to a predetermined region adjacent said bearing portion comprising a funnel for surrounding said shaft on each side of said bearing portion, each of said funnels having its small end adjacent said bearing portion and one of said funnels having a taper proportioned to form with a shaft in said bearing a capillary passage for lubricant, and a lubricant reservoir for said bearing member, said one funnel having a slot in its wall communicating with said reservoir for permitting the passage of lubricant between said reservoir and said bearing portion.

PAUL PASCHEN.
GEORG MOHR.